United States Patent [19]

Belliveau et al.

[11] 4,363,556
[45] Dec. 14, 1982

[54] CONTINUOUS STRIP COLD DETECTOR

[75] Inventors: Raymond E. Belliveau, West Caldwell; Simon J. Larkin, West Milford, both of N.J.

[73] Assignee: Walter Kidde & Co., Belleville, N.J.

[21] Appl. No.: 111,967

[22] Filed: Jan. 14, 1980

[51] Int. Cl.³ ................ G01K 7/10; G01K 7/20
[52] U.S. Cl. .................... 374/183; 252/521; 338/22 R; 338/195; 340/507; 340/599; 374/185
[58] Field of Search ............ 73/362 AR; 338/26, 203, 338/295, 213, 214, 195, 25, 28; 340/507, 510, 540, 548, 599

[56] References Cited

U.S. PATENT DOCUMENTS

| | | | |
|---|---|---|---|
| 795,803 | 7/1905 | Vedovelli | 338/213 |
| 3,015,633 | 1/1963 | Humbert et al. | 252/519 |
| 3,017,592 | 1/1962 | Keller et al. | 338/28 |
| 3,019,404 | 1/1962 | Fastenau et al. | 338/28 |
| 3,091,957 | 6/1963 | Hampton et al. | 73/362 AR |
| 3,104,550 | 9/1963 | Weisheit et al. | 73/362 AR |
| 3,110,088 | 11/1963 | Blom | 338/213 X |
| 3,222,578 | 12/1965 | Thiele | 73/295 |
| 3,266,002 | 8/1966 | O'Hanlon | 338/28 |
| 3,418,648 | 12/1968 | Futaki | 340/595 |
| 3,781,837 | 12/1973 | Anderson et al. | 340/599 X |
| 3,962,145 | 6/1976 | Matsuo et al. | 252/521 |
| 3,988,725 | 10/1976 | Doherty | 340/510 |
| 4,050,308 | 9/1977 | Lee | 340/596 X |
| 4,063,447 | 12/1977 | Mathison | 340/510 X |
| 4,157,541 | 6/1979 | Harwell | 340/510 |
| 4,216,675 | 8/1980 | Nagata et al. | 73/362 AR |

FOREIGN PATENT DOCUMENTS

| | | | |
|---|---|---|---|
| 740884 | 11/1955 | Australia | 340/596 |
| 2812928 | 4/1979 | Fed. Rep. of Germany | 338/195 |
| 1481933 | 8/1977 | United Kingdom | 338/195 |

OTHER PUBLICATIONS

Publ. IBM Technical Disclosure Bulletin, vol. 13, No. 5, 10/1970, p. 1105, ("Modular Resistor Array").

*Primary Examiner*—Daniel M. Yasich
*Attorney, Agent, or Firm*—Darby & Darby

[57] ABSTRACT

A continuous strip sensor for detecting extremely cold temperatures is disclosed. The sensor includes a plurality of series connected sections each of which exhibits a substantial increase in resistance upon exposure to an extremely cold temperature. A detection circuit utilizing the above sensor provides compensation for changes in ambient temperature by means of a compensation-sensor having the same total resistance and resistance-temperature characteristic as the cold sensor. The detection circuit also detects the occurrence of faults in the cold sensor or the compensation-sensor.

9 Claims, 4 Drawing Figures

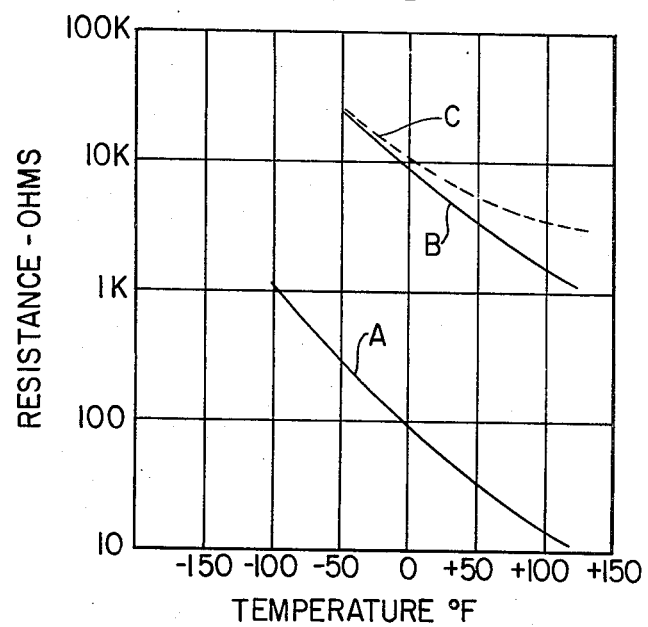
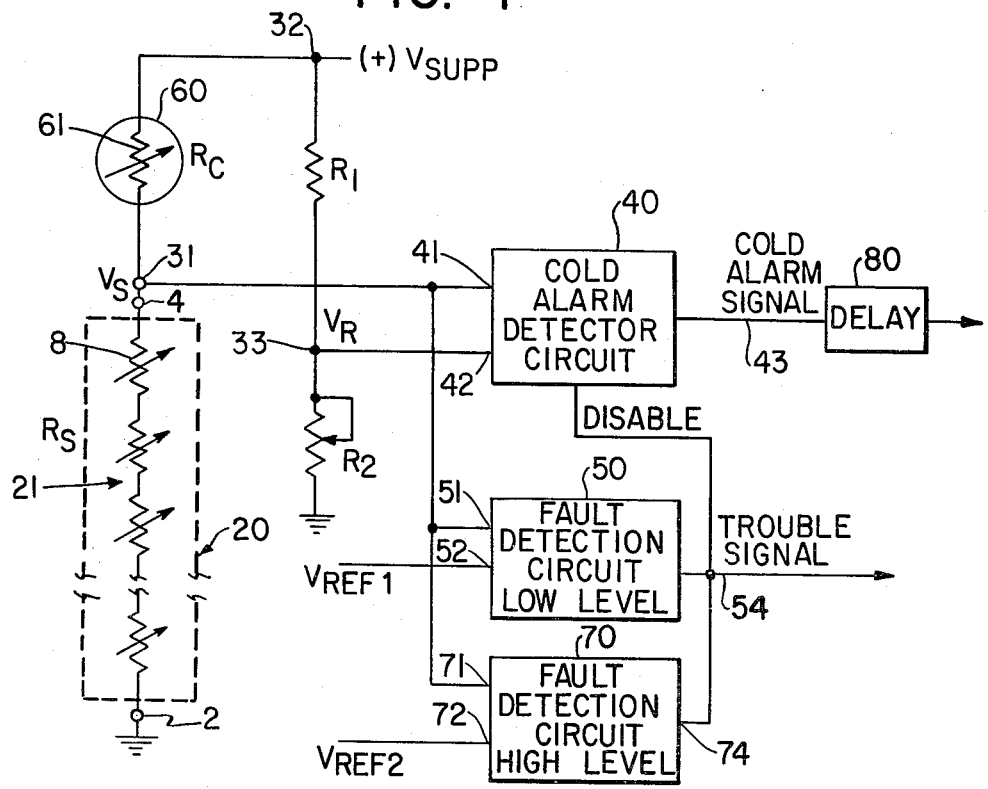

CONTINUOUS STRIP COLD DETECTOR

This invention relates to temperature sensitive alarm systems and more particularly to systems for detecting the occurrence of relatively cold temperatures or decreases in temperature anywhere in a comparatively large area such as an area in which a cryogenic system is installed.

A leak of fluid from a cryogenic system (e.g., a system for storing and transporting liquid nitrogen or liquid natural gas) can present extreme danger to personnel in the area of the system and also cause extensive damage to the surrounding area. It is most desirable, therefore, that any such leaks to be detected as quickly as possible.

Presently available sensors for the detection of relatively cold temperatures which may occur with spilling or leakage of cryogenic liquids are "spot sensors" and generally of the thermal switch-type or bulb-type. Bulb-type sensors, for example, contain gas or liquid which contracts upon exposure to extreme cold. This contraction activates an electrical switch which, in turn, may actuate an appropriate alarm. The maximum active length of such bulb type sensors is in the order of approximately 3 to 5 feet. Since a complete cryogenic system may cover hundreds or thousands of square feet, a large number of such "spot" sensors must be included in an alarm system in order to insure that a timely warning is generated for a leak of cryogenic fluid anywhere in the system. The cost of a sufficiently large number of "spot" sensors, and the associated costs of wiring these sensors into the alarm system may be so large as to be prohibitive where coverage of a large cryogenic system is desired. Moreover, utilization of a smaller number of spot sensors could result in less than adequate protection.

Continuous strip-type temperature sensors have been used to detect relatively high temperatures or increases in temperature which may, for example, be caused by fire, or other overheating conditions. Such a sensor is described in U.S. Pat. No. 2,586,252 of Peters. The sensor set forth by this patent comprises a pair of electrically conductive wires which pass through and are fused to a plurality of thermistor beads. The wires are maintained in spaced relationship from each other by the beads. Each bead has the property of being substantially non-conductive to electricity at normal temperature. At high temperatures, however, the beads become increasingly electrically conductive. The circuit formed by such wires and thermistor beads is a parallel or ladder-type circuit which is essentially non-conductive at normal temperatures. This circuit is connected in series with an alarm circuit so that if any one or more of the thermistor beads becomes conductive by reason of exposure to an abnormally high temperature the ladder network is made conductive, the alarm circuit is completed and the alarm is activated.

Although the above described circuit is effective for the detection of relatively high temperatures, it is not effective for the detection of relatively low temperatures. Such low temperatures would act to increase the resistance of each of the thermistor beads which were exposed to it. However, since the total resistance of such a ladder circuit is always lower than the resistance of its lowest resistance leg, the change in total circuit resistance caused by the increased resistance of a small number of the plurality of its legs would be too small to be effectively detected and utilized to activate an alarm circuit.

In accordance with the present invention, therefore, a temperature sensor element is provided which comprises a pair of uninsulated electrically conductive wires which are maintained in spaced relationship from each other by a plurality of equally spaced thermistor beads. Each of the beads has the property of increasing its resistance with decreases in temperature. The above structure is separated into a plurality of sensor sections by alternately cutting one or the other of the wires at equally spaced intervals (e.g., one foot). Each of the above sensor sections is thus a ladder-type network, such as that of the U.S. Pat. No. 2,586,252, in which the legs of the ladder are the thermistor beads. The complete circuit sensor element of the present invention, however, comprises a plurality of the sensor sections which are interconnected in series. Consequently, if the resistance of one or more of these comparatively short sensor sections is increased by reason of exposure to an extremely cold temperature, the total resistance of the entire sensor element will increase by an amount equal to the sum of the resistance changes in the effected sensor sections.

It will be appreciated that the above sensor element can be highly sensitive to changes in ambient temperature. In order to prevent such changes in ambient temperature from producing false alarms, the present invention includes a sensing circuit which compensates for changes in resistance in the above sensor element which may be caused by changes in ambient temperature. In a preferred embodiment, this sensing circuit comprises a bridge circuit in which a cold detector including the above sensor element comprises one leg of the bridge and another of the bridge includes a temperature compensating sensor. This temperature compensating sensor includes a comparatively short sensor element, (e.g., in the order of 6 to 12 inches), of the type described above, in which the wires are cut in a manner such that for any given ambient temperature, the compensating sensor element has the same total resistance and resistance-temperature characteristic as the temperature sensor element.

It is an object of the present invention, therefore, to provide a detector for extremely cold temperatures which is adapted to sense the presence of extremely cold temperatures anywhere within a comparatively large area.

It is another object of the present invention that the detector include a sensor element which exhibits a significant and measurable change of total resistance upon exposure of a comparatively small portion of the sensor element to an extremely cold temperature.

It is further of the invention that the above cold detector sensitive element be simple in design and relatively inexpensive to construct and install.

It is a still further object of the invention to provide a sensing circuit which is responsive to resistance changes in the above sensor element element due to exposure of a portion of the element to an extremely cold temperature but which is substantially unresponsive to resistance changes in the sensor element caused caused by changes in ambient temperature.

This inveniton is pointed out with particularity in the appended claims. An understanding of the above further objects and advantages of this invention may be obtained by referring to the following description in conjunction with the following drawings wherein:

FIG. 3 is a chart illustrating the temperature-resistance characteristic of a typical sensor element of the present inventon; and FIG. 4 is a circuit diagram, partially in block form, illustrating a resistance sensitive alarm circuit for utilization with the detector of FIG. 1.

Figure 1:
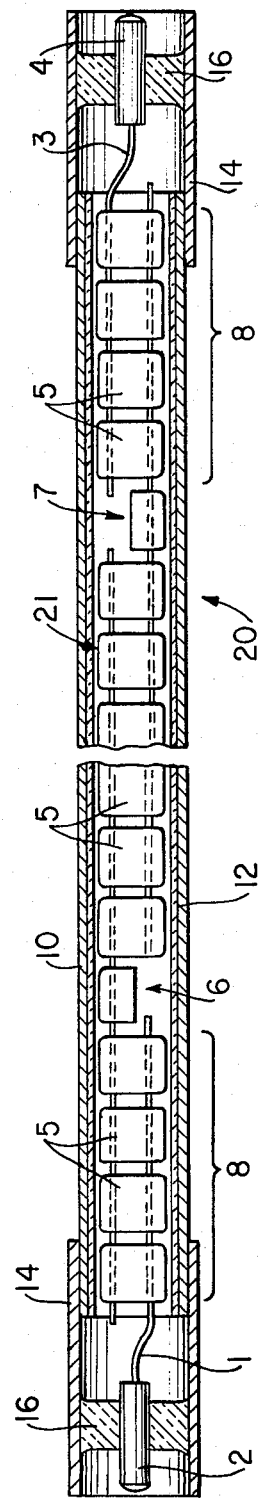
FIG. 1 illustrates detector of extreme cold in accordance with the invention with portions cut away.

FIG. 1 illustrates a preferred embodiment of a continuous strip cold detector 20. This detector includes a sensor element 21. Sensor element 21 comprises an elongated uninsulated electrically conductive wire 1 which is connected to an output terminal 2, and a similar electrically conductive wire 3 which is connected to an output terminal 4. The wires 1 and 3 are maintained in a generally parallel spaced relationship by a plurality of thermistor beads 5 which are molded over the wires 1 and 3 so that each bead 5 is electrically connected across the wire 1 and the wire 3. The method of molding these thermistor beads 5 between the wires 1 and 3 may be one such as that disclosed in U.S. Pat. No. 2,495,867 of Peters.

A temperature sensor element manufactured in accordance with the method disclosed by the above patent comprises a plurality of thermistor beads which are connected between a pair of wires so that a circuit is formed in which each of the thermistor beads is connected in parallel between the two wires. In accordance with the present invention, however, the electrical continuity of the wire 1 or the wire 3 is alternatively broken at predetermined intervals along the length of the complete sensor. To accomplish this breaking of continuity it has been found convenient to break each of the beads 5 lying at the above intervals so as to remove a portion of each bead containing the appropriate segment of the wire 1 or the wire 3. This breaking and removal may be accomplished, by any convenient means such as cutting the bead with an abrasive wheel or a laser. The locations at which these beads are broken are indicated in FIG. 1 by the reference numerals 6 and 7. A sensor element 21 in accordance with the present invention may be of any convenient length up to but not limited to 100 feet. It has been found convenient to alternatively break the conductive paths of the wires of such a sensor element at intervals of approximately one foot thereby forming a plurality of one foot long sensor sections 8.

Figure 2:
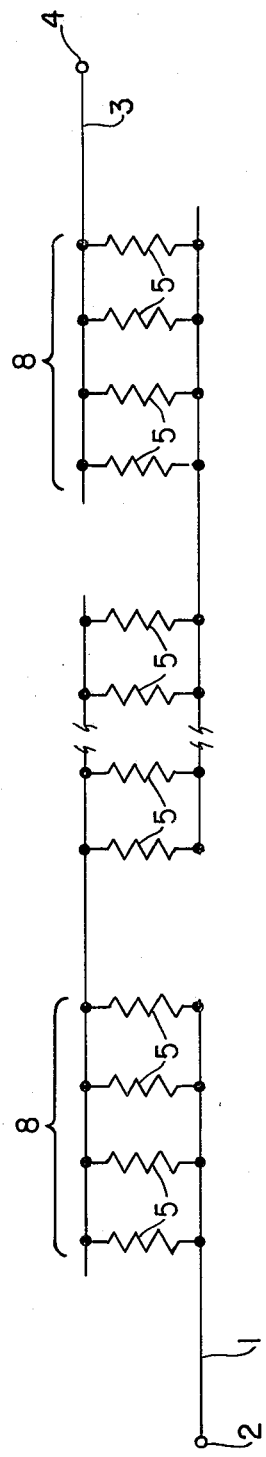
FIG. 2 is an electrical schematic diagram of the circuit of the sensor element of the detector of FIG. 1.

The electrical circuit of the sensor element 20 of FIG. 1 is illustrated by FIG. 2. As illustrated by FIG. 2 the circuit has a plurality of sensor sections 8 which are connected in series with each other. Each of the sensor sections 8 includes a plurality of parallel connected resistances formed by the thermistor beads 5.

Referring again to FIG. 1, the sensor element 21 is enclosed within a metallic tube 10. The thermistor beads 5 are electrically insulated from the metallic tube 10 by a non-electrically conductive material 12 such as Teflon. The structure is completed by a pair of end connectors 14, also of metal, which are joined to respective ends of the tube 10. Each of these end connectors 14 includes a hermetic seal 16 which prevents moisture and other contaminants from entering the interior of the tube 10.

Each of the thermistor beads 5 of FIG. 1 has a negative temperature coefficient (NTC), i.e., its resistance increases as a function of decreases in temperature. For the purpose of detecting relatively low temperatures, thermistor beads formed of a composition comprising maganese dioxide, copper oxide, magnesium aluminum silicate (talc), and a frit comprising silicon with the addition of material such as aluminum, calcium, barium and sodium has been found to be preferable. The manganese dioxide in the above composition exhibits the required temperature resistance characteristics. The copper oxide is used to reduce the ambient temperature resistance of the thermistor beads to a desired low level. The talc provides the desired ceramic structure which may also be provided by alternative materials such as zircon or alumina. Finally, the frit is a fluxing material for causing fusion of the other particles. Table 1 below lists the relative proportions of the above materials in a preferred composition of the thermistor beads 5 and also lists the approximate range of variation of these proportions which is possible within the scope of the present invention.

TABLE 1

| Ingredient | Preferred Proportion (% by weight) | Range (% by weight) |
| --- | --- | --- |
| Manganese Dioxide | 70 | 60–75 |
| Copper Oxide | 20 | 15–25 |
| Talc | 5 | 5–20 |
| Frit | 5 | 5–10 |

Referring to FIG. 3, curve A illustrates the temperature resistance characteristic of a single one-foot sensor section 8 of the present invention.

In general, the resistance of the sensor section 8 increases logarithmically with decreases in temperature. Thus, in the temperature range covered by curve A, it will be noted that the resistance of such a sensor section 8 varies from a low value of about 11 ohms at approximately 125° F. to a high value of apporoximately 1100 ohms at −100° F.

Curve B illustrates the temperature resistance characteristic of a 100 foot long sensor element 21 of the present invention which comprises a plurality of one-foot sensor sections 8 interconnected in series as described above. It will be noted that at any given temperature the total resistance of the sensor element 21 is greater than the resistance of each of the one-foot sensor sections 8 comprising it by a factor of 100. This characteristic is the result of the series interconnection of the sensor sections 8.

Curve C illustrates the temperature resistance characteristic of 100 foot sensor element 21 of the present invention where 98 of its one-foot sensor sections 8 are at ambient temperature and the remaining two sensor sections 8 have been cooled to a temperature of −100° F. Comparing the curves B and C it will be noted that, for any given ambient temperature, a cooling of two of the sensor sections 8 results in a significant and measurable resistance change in the entire sensor element 21. For example, at an ambient temperature of 50° F. a sensor element 21 with all of its sensor sections 8 at this ambient temperature has a total resistance of approximately 3.5k ohms. The same sensor element 21 having two of its sensor sections 8 cooled to −100° F. exhibits a total resistance of approximately 5.3k ohms. This 1.8k ohm difference in resistance represents a percentage change of more than 50% over the ambient temperature value and is easily measurable.

FIG. 4 illustrates a preferred embodiment of a detection circuit, utilized in conjunction with the continuous strip cold detector 20 described above, for detecting a change in the resistance of the detector 20 indicative of exposure of the detector to a cryogenic liquid such as liquid nitrogen. This circuit activates a signal for actuating an alarm device upon the detection of such a change in resistance in the detector 20. As described in greater detail below, the circuit of FIG. 4 also provides a trouble signal upon the occurrence of a fault, such as a break, in the detector 20 or upon the occurrence of a similar fault within its own circuitry.

The circuit of FIG. 4 comprises a bridge having terminals 31, 32 and 33. A fourth terminal of the bridge is provided by ground. A continuous strip cold detector 20 of the present invention is connected between ground and the terminal 31. A compensation sensor 60 is connected between the terminal 31 and the terminal 32, the combination of the detector 21 and the compensation sensor 60 comprising a first series circuit. This compensation sensor 60 is a device of similar construction to the detector 20 which has a comparatively short temperature sensor element 61 (e.g., in the order of 1 foot in length) in which appropriate thermistor beads 5 have been broken at comparatively short intervals as described above. These intervals are selected so that the total resistance of the compensation sensor element 61 equals the total resistance of the sensor element 21 at any given ambient temperature, and the temperature resistance characteristic of the compensation sensor element 61 matches the temperature resistance characteristic of the sensor element 21. A second series circuit comprising a resistor $R_1$ of fixed resistance connected between the terminal 32 and the terminal 33, and a variable resistor $R_2$ (e.g., a potentiometer) is connected between the terminal 33 and ground.

The terminal 32 is connected to a supply voltage ($V_{SUPL}$) which in the preferred embodiment is +12 volts d.c. The terminal 31 is also connected to an input terminal 41 of a cold alarm detector circuit 40 and to an input terminal 51 of a low level fault detection circuit 50 and to an input terminal 71 of a high level fault detection circuit 70. The terminal 33 is also connected to an input terminal 42 of the cold alarm detector circuit 40.

An input terminal 52 of the low level fault detection circuit 50 is supplied with a first reference voltage ($V_{REF\,1}$) and an input terminal 72 of the high level fault detection circuit 70 is supplied with a second reference voltage ($V_{REF\,2}$).

The cold alarm detector 40 has an output terminal 43 at which a cold alarm signal is activated upon the occurrence of a change of resistance of the sensor element 21 of a predetermined magnitude indicative of sensor element 21 having been exposed to an extremely cold temperature. The fault detection circuits 50 and 70 have respective output terminals 54 and 74 at which trouble signals are activated upon the occurrence of a fault such as a break in, for example, the sensor element 21 or the compensation sensor element 61.

Thus, the fault detection circuits 50 and 70 in combination comprise a trouble signal activator having a first input terminal (terminals 51 and 71), a second input terminal (terminal 72), a third input terminal (terminal 52) and an output terminal (terminals 54 and 74).

The circuit illustrated by FIG. 4 operates as follows. Assuming that the compensation sensor element 61 and the sensor 21 are both at ambient temperature their resistances will be equal. Under these conditions the voltage ($V_S$) at the terminal 31 will be +6 volts d.c. assuming that the supply voltage ($V_{SUPL}$) at terminal 32 is +12 volts d.c. It will be appreciated that since the compensation sensor element 61 and the sensor element 21 have the same temperature-resistance characteristic, any change in ambient temperature will produce equal changes in the respective resistances of the compensation sensor element 61 and the sensor element 21. Consequently, the voltage $V_S$ at terminal 31 will remain constant regardless of such changes in ambient temperature.

During the installation of the system the resistor $R_2$ is adjusted so that the voltage $V_R$ at terminal 33 is somewhat different from the voltage $V_S$ at terminal 31. In the present illustrative embodiment, for example, $R_2$ is adjusted so that $V_R$ is approximately +7 volts d.c.

The cold alarm detector circuit 40 is a conventional voltage detection or comparison circuit which is configured to activate a cold alarm signal at its output terminal 43 when the voltage at its input terminal 41 is equal to or greater than the voltage at its input terminal 42. Since, with the compensation sensor element 61 and the sensor element 21 both at ambient temperature, the voltage at terminal 41 will be +6 volts and the voltage at terminal 42 will be approximately +7 volts no alarm would be produced. Upon the exposure of one or more of the sensor sections 5 of the sensor element 21 to a relatively low temperature, however, the resistance of the sensor element 21 increases significantly, as discussed above. The resistance of the compensation sensor element 61 would, however, be unaffected by the exposure of the sensor element 21 to the relatively low temperature. Under these conditions the voltage drop between the terminal 31 and ground will be greater than the voltage drop between the terminal 32 and the terminal 31. Thus $V_S$ will become greater than the $V_R$ and the cold alarm detector circuit 40 will be conditioned to activate the cold alarm signal at its output terminal 43.

In the presently preferred embodiment the fault detection circuits 50 and 70 comprise conventional voltage detection or comparison circuits. The voltage detection circuit of fault detection circuit 50 compares the voltage $V_S$ at the input terminal 51 with a voltage $V_{REF\,1}$ at the terminal 52 to determine whether a fault such as a break has occurred in the compensation sensor element 61. Fault detection circuit 50 is configured to activate the trouble signal at its output terminal 54 when $V_S$ decreases to the level of the reference voltage $V_{REF\,1}$ which is set well below the nominal operating level of $V_S$. Preferably, $V_{REF\,1}$ is set at +2 volts d.c. Under normal operating conditions, $V_S$ will always be greater than +2 volts and fault detection circuit 50 will not activate the trouble signal at the output terminal 54. If, however, a fault such as a break occurs in the compensation sensor element 61, $V_S$ will go to ground potential (0 volts) or close to it. With $V_S$ at 0 volts, therefore, the voltage at terminal 52 is 2 volts higher than the voltage at terminal 51 and the trouble signal will be activated.

Fault detection circuit 70 is provided to detect the occurence of faults, such as breaks in the sensor 20. For this purpose $V_{REF\,2}$ is set well above the normal operating level of $V_S$ so that any fault in sensor 20 which causes $V_S$ to rise to or above the level of $V_{REF\,2}$ will be detected. In the preferred embodiment $V_{REF\,2}$ is set at approximately +9 volts d.c. Fault detection circuit 70 is configured to produce an alarm when the level of $V_S$ at terminal 71 increases to the +9 volt level of $V_{REF\,2}$ at terminal 72. Under normal operating conditions $V_S$ will always be less than 9 volts and the trouble signal at terminal 74 will not be activated. If the sensor element 21 is broken, however, $V_S$ will go to about +12 volts. Under these conditions the voltage at terminal 71 is 3 volts higher than the voltage at terminal 72 and the fault detection circuit 70 activates the trouble signal at its output terminal 74.

It will be noted that the increase in the level of $V_S$ caused by the above type of fault would cause the cold alarm detector circuit 40 to be activated simultaneously with the activation of the fault detection circuit 70. To prevent the occurrence of false cold alarms, therefore, a delay circuit 80 (e.g., a conventional RC network with an appropriate time constant) is provided to delay the output of the cold alarm detector circuit 40 by about 30 to 50 milliseconds. Alarm circuit 40 also includes means for being disabled which is activated by an output from either of the fault detection circuits 50 or 70. Thus, during the delay period, an output from either of the fault detection circuits disables the cold alarm circuit 40 thereby preventing the occurrence of a false cold alarm.

The output terminal 43 of the cold alarm detector circuit 40 and the output terminals 54 and 74 of the fault detection circuits may be connected respectively to conventional indicating devices at a central control location (e.g., indicator lights or audible alarms) so that the respective indicating device will be activated upon the occurrence of the corresponding condition.

Although specific embodiments of the present invention have been disclosed for illustrative purposes, it will be appreciated by those skilled in the art that many additions, modifications and substitutions are possible without departing from the scope and spirit of the invention as defined in the accompanying claims.

What is claimed is:

1. A sensor for detecting cryogenic temperatures comprising a plurality of sensor sections electrically connected in series circuit relationship, each said section including:
   a first uninsulated electrically conductive wire;
   a second uninsulated electrically conductive wire;
   a plurality of thermistor beads electrically connected in parallel across said first and said second wires at substantially equal longitudinal intervals along said first and said second wires;
   each said bead having a resistance which increases with decreases in the temperature of said bead and each said bead being formed of a mixture comprising:
   manganese dioxide in the amount of 60–75% by weight,
   copper oxide in the amount of 15–25% by weight,
   a material selected from the group consisting of magnesium aluminum silicate, zircon and alumina in the amount of 5–20% by weight, and
   frit in the amount of 5–10% by weight.

2. A sensor in accordance with claim 1 wherein at any given temperature the electrical resistance of each said section is substantially equal.

3. A sensor in accordance with claim 1 wherein the resistance of each said section increases logarithmically with a decrease in the temperature of said section.

4. Apparatus including a sensor in accordance with claim 1 for detecting cryogenic temperatures and further comprising:
   a compensation-sensor having a resistance and resistance-temperature characteristic substantially identical to that of said cryogenic temperature sensor for compensating for normal variations in ambient temperature;
   means operatively connected to said cryogenic temperature sensor and said compensation-sensor for detecting a difference between the resistance of said cryogenic temperature sensor and the resistance of said compensation-sensor.

5. Apparatus in accordance with claim 4 wherein said cryogenic sensor and said compensation-sensor are connected to form a series circuit, said circuit being connected across a first terminal and a second terminal of a d.c. voltage source and wherein said detecting means comprises:
   means for detecting a substantial difference between the voltage drop across said cryogenic temperature sensor and the voltage drop across said compensation-sensor.

6. Apparatus in accordance with claim 5 further comprising:
   a second series circuit including a fixed resistor and a variable resistor, said second series circuit being connected in parallel circuit relationship with the said first series circuit, said variable resistor being adjustable to a value at which at ambient temperature a first voltage at the point of interconnection of said cryogenic temperature sensor and said compensation-sensor differs from a second voltage at the point of interconnection of said fixed resistor and said variable resistor by a predetermined amount;
   and wherein said detecting means comprises,
   means for comparing said first voltage to said second voltage.

7. Apparatus in accordance with claim 5 further comprising:
   a trouble signal activator including
   a first input terminal connected to the point of interconnection of said cryogenic temperature sensor and said compensation-sensor,
   a second input terminal connected to a first reference voltage which is greater than the voltage at said second voltage source terminal by a first predetermined amount,
   a third input terminal connected to a second reference voltage which is lower than the voltage at said first d.c. source terminal by a second predetermined amount,
   means responsive to the voltage at said first input terminal being lower than said first reference voltage by approximately said first predetermined amount for activating a trouble alarm signal, and
   means responsive to the voltage at said first input terminal being higher than said second reference voltage by approximately said second predetermined amount for activating said trouble alarm signal at said output terminal.

8. Apparatus in accordance with claim 4 further comprising:
   means operatively connected to said cryogenic temperature sensor and said compensation sensor and responsive to the occurrence of a fault in said cryogenic temperature sensor or said compensation-sensor for activating a trouble alarm signal.

9. Apparatus in accordance with claim 8 further comprising:
   means responsive to the activation of said trouble alarm signal for disabling said detecting means.

* * * * *